(12) United States Patent
Lee et al.

(10) Patent No.: US 10,660,054 B2
(45) Date of Patent: May 19, 2020

(54) SYNCHRONIZATION SIGNAL TRANSMISSION METHOD USING SYNCHRONIZATION SUBFRAME IN WIRELESS COMMUNICATION SYSTEM

(71) Applicant: LG ELECTRONICS INC., Seoul (KR)

(72) Inventors: Kilbom Lee, Seoul (KR); Kijun Kim, Seoul (KR); Jaehoon Chung, Seoul (KR); Hyukjin Chae, Seoul (KR); Kyuseok Kim, Seoul (KR); Minki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/080,654

(22) PCT Filed: Feb. 28, 2017

(86) PCT No.: PCT/KR2017/002202
§ 371 (c)(1),
(2) Date: Aug. 28, 2018

(87) PCT Pub. No.: WO2017/150889
PCT Pub. Date: Sep. 8, 2017

(65) Prior Publication Data

US 2019/0028984 A1   Jan. 24, 2019

Related U.S. Application Data

(60) Provisional application No. 62/300,935, filed on Feb. 29, 2016, provisional application No. 62/313,152, filed on Mar. 25, 2016.

(51) Int. Cl.
*H04L 12/28* (2006.01)
*H04W 56/00* (2009.01)
(Continued)

(52) U.S. Cl.
CPC ........ *H04W 56/001* (2013.01); *H04B 7/0617* (2013.01); *H04J 11/00* (2013.01);
(Continued)

(58) Field of Classification Search
CPC .... H04W 56/001; H04W 72/042; H04L 7/08; H04J 1/0076; H04J 11/0073; H04B 7/088
(Continued)

(56) References Cited

U.S. PATENT DOCUMENTS

2014/0198747 A1   7/2014   Ouchi et al.
2015/0373628 A1 * 12/2015   Hwang ................ H04W 48/16
                                                370/338
(Continued)

FOREIGN PATENT DOCUMENTS

WO   2015042803   4/2015
WO   2015122715   8/2015

OTHER PUBLICATIONS

PCT International Application No. PCT/KR2017/002202, Written Opinion of The International Searching Authority dated Jun. 7, 2017, 16 pages.
(Continued)

*Primary Examiner* — John Pezzlo
(74) *Attorney, Agent, or Firm* — Lee Hong Degerman Kang Waimey

(57) ABSTRACT

A synchronization signal transmission method and a base station are disclosed, the method comprising: generating a PSS group by applying an OCC to a combination of mutually different PSS sequences to be transmitted across multiple time intervals; disposing a SSS in a region that is adjacent, on a frequency axis, to a resource region assigned to the PSS group; generating a synchronization signal comprising the PSS group and the SSS; and transmitting the synchronization signal across multiple time intervals.

10 Claims, 7 Drawing Sheets

(51) Int. Cl.
*H04J 11/00* (2006.01)
*H04B 7/06* (2006.01)
*H04L 27/26* (2006.01)
*H04L 5/00* (2006.01)
*H04L 7/08* (2006.01)
*H04J 1/16* (2006.01)

(52) U.S. Cl.
CPC ....... *H04J 11/0073* (2013.01); *H04J 11/0076* (2013.01); *H04L 5/005* (2013.01); *H04L 5/0048* (2013.01); *H04L 7/08* (2013.01); *H04L 27/2613* (2013.01); *H04L 27/2692* (2013.01)

(58) Field of Classification Search
USPC .............................. 370/252, 329, 386, 430
See application file for complete search history.

(56) References Cited

U.S. PATENT DOCUMENTS

2016/0043848 A1* 2/2016 Kim ................. H04L 5/0051
370/280
2019/0182817 A1* 6/2019 Agiwal ............ H04W 72/0406

OTHER PUBLICATIONS

Mediatek, "Secondary synchronization signal design for NB-IoT", 3GPP TSG RAN WG1 Meeting #84, R1-160835, Feb. 2016, 6 pages.

* cited by examiner

SYNCHRONIZATION SIGNAL TRANSMISSION METHOD USING SYNCHRONIZATION SUBFRAME IN WIRELESS COMMUNICATION SYSTEM

CROSS-REFERENCE TO RELATED APPLICATIONS

This application is the National Stage filing under 35 U.S.C. 371 of International Application No. PCT/KR2017/002202, filed on Feb. 28, 2017, which claims the benefit of U.S. Provisional Application No. 62/300,935, filed on Feb. 29, 2016, and 62/313,152, filed on Mar. 25, 2016, the contents of which are all hereby incorporated by reference herein in their entireties.

TECHNICAL FIELD

Following description relates to a wireless communication system, and more particularly, to a method of transmitting a synchronization signal using a synchronization subframe structure and an apparatus therefor.

BACKGROUND ART

In an ultrahigh frequency wireless communication system using mmWave, a center frequency is configured to operate in several GHz to dozens of GHz. Due to the characteristic of the center frequency, a path loss may considerably occur in a radio shadow area in the mmWave communication system. Since it is necessary to stably transmit a synchronization signal to all UEs belonging to the coverage of a base station, in the mmWave communication system, it is necessary to design and transmit a synchronization signal in consideration of a potential deep-null phenomenon capable of being occurred due to the characteristic of the ultrahigh frequency band.

DISCLOSURE OF THE INVENTION

Technical Tasks

The present invention is designed to solve the aforementioned problem. An object of the present invention is to improve a transmission efficiency of a synchronization signal by improving a synchronization procedure between a base station and a user equipment in a wireless communication system using an ultrahigh frequency band such as mmWave.

Another object of the present invention is to provide a synchronization transmission method using an antenna array structure including a plurality of subarrays.

The other object of the present invention is to provide a method of transmitting a synchronization signal in a communication system using an ultrahigh frequency band.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting a synchronization signal, which is transmitted by a base station in a communication system using an mmWave band, includes the steps of generating a PSS group by applying an OCC (Orthogonal Cover Code) to a combination of PSS (Primary Synchronization Signal) sequences different from each other to be transmitted over a plurality of time durations, arranging an SSS to a region adjacent to a resource region allocated to the PSS group on a frequency axis, generating a synchronization signal consisting of the PSS group and the SSS, and transmitting the synchronization signal over a plurality of the time durations. In this case, the PSS group may correspond to a physical layer ID.

The PSS group is transmitted in a single basic synchronization signal block included in a synchronization subframe and the single basic synchronization signal block may correspond to a wide beam area configured by a plurality of antenna subarrays.

The PSS group can be generated by applying an OCC to a combination of PSS sequences in a conjugate relationship.

The PSS group is generated by applying an OCC to a combination of a first PSS sequence and a second PSS sequence, the first PSS sequence and the second PSS sequence are not in a conjugate relationship, and each of the first PSS sequence and the second PSS sequence may correspond to one of a plurality of PSS sequences in a conjugate relationship.

PSS groups having a different size can be configured to satisfy a nested property.

A different OCC is applied to the SSS and a different OCC can be applied to SSSs transmitted in a different basic synchronization signal block.

To further achieve these and other advantages and in accordance with the purpose of the present invention, according to a different embodiment, a base station transmitting a synchronization signal in a communication system using an mmWave band includes a transmitting unit, a receiving unit, and a processor configured to operate in a manner of being connected with the transmitting unit and the receiving unit, the processor configured to generate a PSS group by applying an OCC (Orthogonal Cover Code) to a combination of PSS (Primary Synchronization Signal) sequences different from each other to be transmitted over a plurality of time durations, the processor configured to arrange an SSS to a region adjacent to a resource region allocated to the PSS group on a frequency axis, the processor configured to generate a synchronization signal consisting of the PSS group and the SSS, the processor configured to transmit the synchronization signal over a plurality of the time durations. In this case, the PSS group may correspond to a physical layer ID.

Advantageous Effects

According to the embodiments of the present invention, the following effects may be expected.

First of all, since a synchronization procedure between a base station and a user equipment is improved in a wireless communication system, it is able to efficiently transmit and receive a synchronization signal between the base station and the user equipment.

Second, since an appropriate synchronization signal transmission method is performed in an antenna array structure including a plurality of subarrays, it is able to improve efficiency of a synchronization procedure.

Third, since it is able to implement a synchronization method in various ways with a simple change, it is able to perform synchronization suitable for various terminal types.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
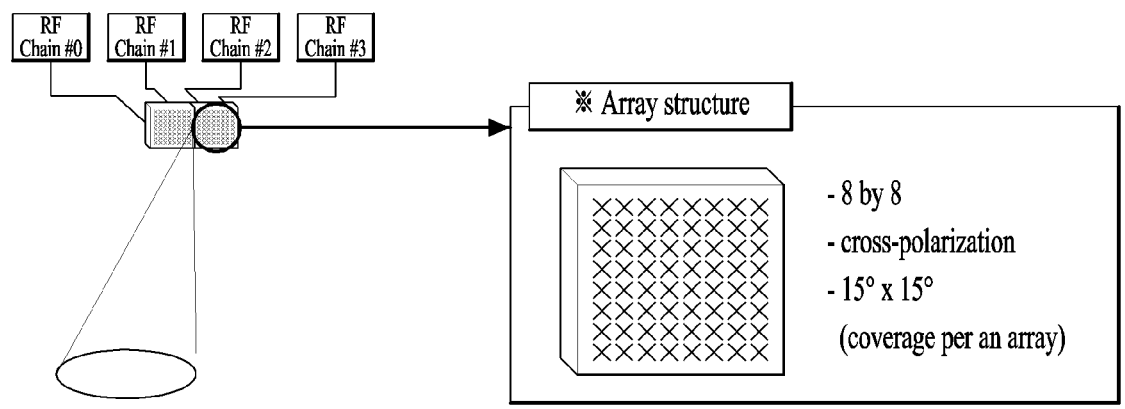
FIG. 1 illustrates a subarray-based antenna structure and an RF beam structure according to the subarray-based antenna structure.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

As discussion on such a next generation communication system using an ultrahigh frequency band as mmWave is in progress, a new antenna structure and an RF beam structure are proposed. FIG. 1 illustrates a subarray-based antenna structure and an RF beam structure according to the subarray-based antenna structure.

Referring to an antenna structure shown in FIG. 1, one single RF beam is defined using 4 antenna subarrays. Two antenna subarrays (simply, subarrays) configure one antenna array (simply, array) and one array is configured by 8(H)*8(V)*2(P) number of antennas. H denotes a horizontal axis, V denotes a vertical axis, and P denotes polarization of an antenna. In particular, one array is arranged by overlapping two subarrays each of which has 8*8=64 antennas of single polarization. As shown in the right side of FIG. 1, two subarrays are implemented in a cross polarization form in a manner of being orthogonally overlapped. Similarly, referring to the left side of FIG. 1, two subarrays are implemented in a form of cross polarization in a manner of being orthogonally overlapped. Similarly, referring to the left side of FIG. 1, two arrays each of which has two overlapped subarrays are arranged. In particular, four subarrays in total are shown in the drawing.

In particular, one array of which multiple antennas are overlapped in a form of cross polarization is referred to as a patch antenna structure. Not only the 8*8 number of antennas but also antennas of a different number are overlapped to configure a form of cross polarization. Meanwhile, as shown in FIG. 1, one RF chain corresponds to one subarray and can control the 8*8 number of antennas having single polarization. In particular, the antenna structure shown in the left side of FIG. 1 corresponds to a form that two arrays are adjacently arranged and four subarrays constructing the two arrays are respectively controlled by the total four RF chains. FIG. 1 illustrates a procedure that the four subarrays generate a single beam under the control of the four RF chains. In this case, a width of the beam may correspond to 15'(H)*15'(V).

Figure 2:
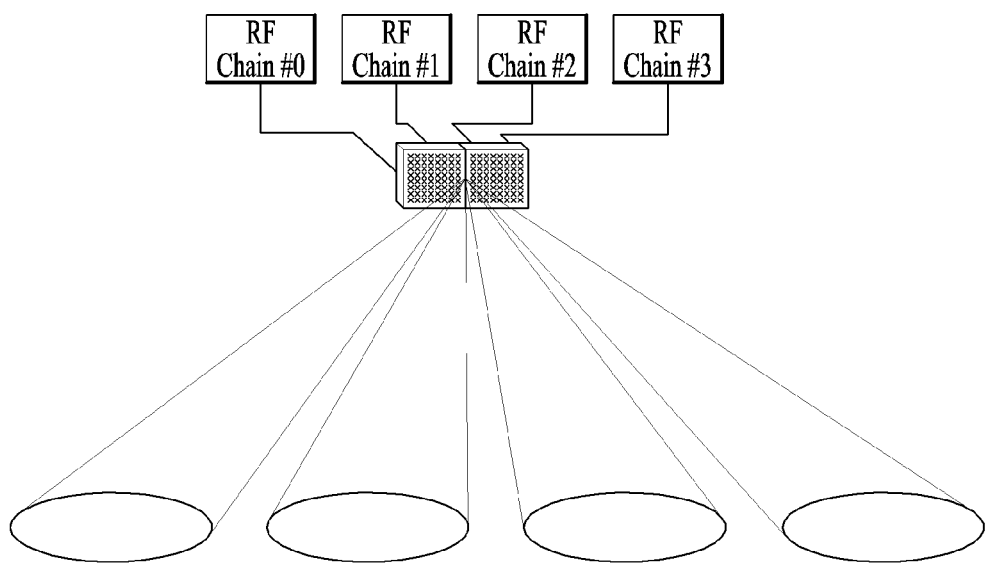
FIG. 2 illustrates a subarray-based antenna structure and a different RF beam structure according to the subarray-based antenna structure.

FIG. 2 illustrates a subarray-based antenna structure and a different RF beam structure according to the subarray-based antenna structure. Unlike FIG. 1, FIG. 2 illustrates a procedure that each of four RF chains independently forms an RF beam and four subarrays form four multi beams. In this case, each of the four beams can cover a different area.

A scheme according to FIGS. 1 and 2 has advantages and disadvantages shown in Table 1 in the following.

TABLE 1

|  | Single beam | Multiple beams |
| --- | --- | --- |
| advantage | High beam gain | Fast beam scanning |
| disadvantage | Slow beam scanning | Low beam gain |

In particular, if RF chains form a single beam, since a beam amount radiated to a specific area increases, a beam gain is high, while a beam scanning procedure, which is required to cover the entire area, is slowly performed. On the contrary, if RF chains form multiple beams, since a beam amount radiated to a specific area is less, a beam gain is low, while a beam scanning procedure is quickly performed.

Figure 3:
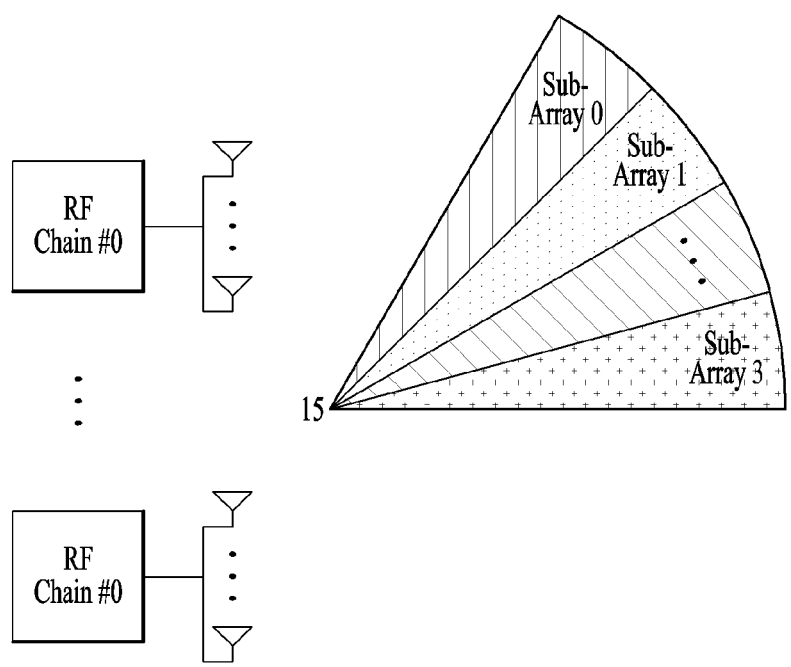
FIG. 3 illustrates a wide beam generated using a narrow beam.

FIG. 3 illustrates a wide beam generated using a narrow beam. In FIG. 3, a narrow beam may correspond to each of beams formed by an antenna subarray in a form of multi beams mentioned earlier in FIG. 2 and a wide beam corresponds to the whole of beams configured by gathering beams formed by subarrays. FIG. 3 illustrates a wide beam generated by four subarrays corresponding to four RF chains.

In the following description, assume that a transmitter transmits a synchronization signal using a wide beam shown in FIG. 3. In particular, all subarrays transmit the same PSS, SSS, and PBCH as a synchronization signal. The PSS (Primary Synchronization Signal) corresponds to a signal for matching timing between a transmitter and a receiver, the SSS (Secondary Synchronization Signal) corresponds to a signal used for the receiver to identify a cell of the transmitter, and the PBCH (Physical Broadcast Channel) corresponds to a channel on which system information of a cell is transmitted.

As shown in Table 1, in case of using a wide beam using multiple beams, it is able to cover a wide area. However, a beam gain becomes low. In order to solve the problem, if synchronization signals are repeatedly transmitted on a time axis, it is able to provide an additional gain to a receiver.

Figure 4:
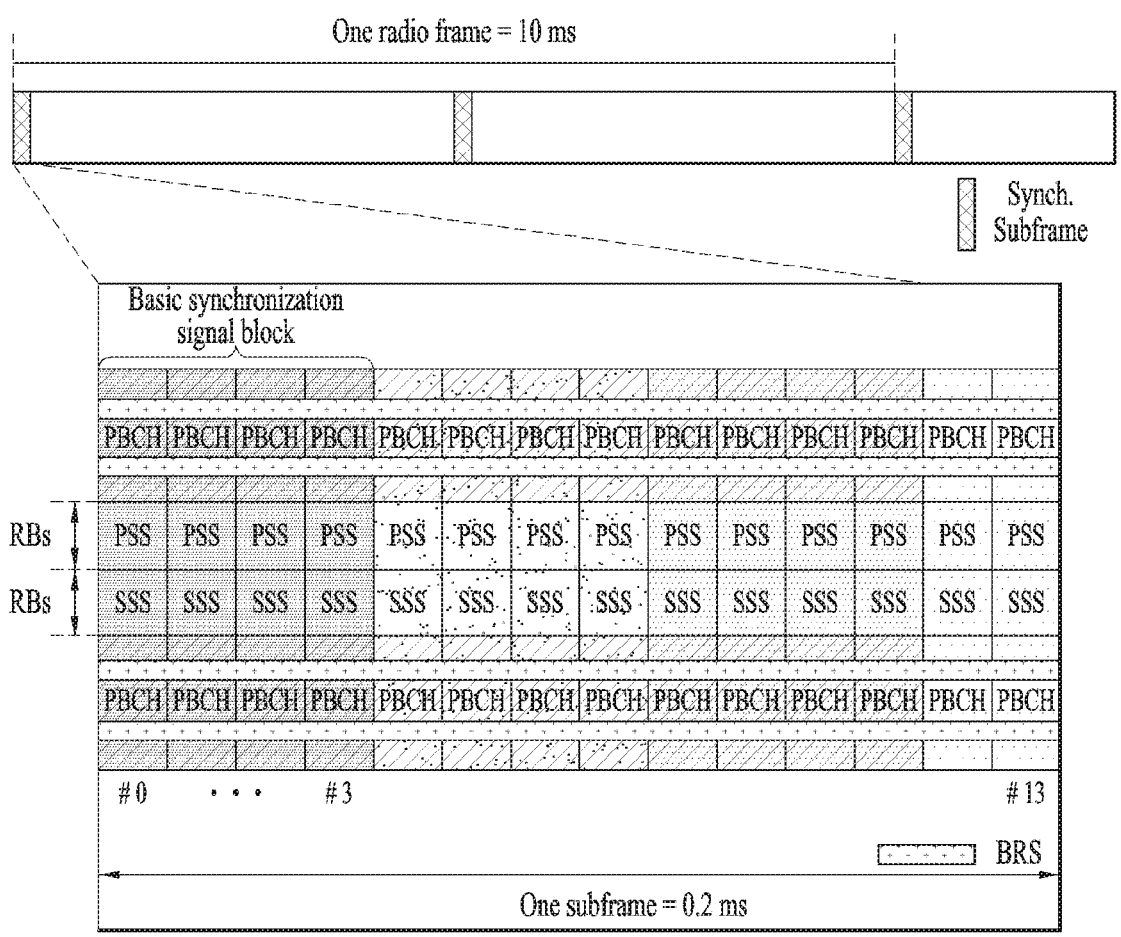
FIG. 4 illustrates a structure of a synchronization subframe considering repetitive transmission of a synchronization signal.

FIG. 4 illustrates a structure of a synchronization subframe considering repetitive transmission of a synchronization signal. In FIG. 4, horizontal direction and vertical direction correspond to a time axis and a frequency axis, respectively.

One radio frame configured by 10 ms includes a plurality of subframes and a synchronization subframe proposed by the present invention can be transmitted in every 5 ms in each frame. FIG. 4 illustrates an example of transmitting a synchronization subframe at the starting point of a frame.

Meanwhile, a synchronization subframe can include a plurality of OFDM (Orthogonal Frequency Division Multiplexing) symbols. Although FIG. 4 illustrates 13 OFDM symbols only, a synchronization subframe can be configured by OFDM symbols less than 13 OFDM symbols or OFDM symbols greater than 13 OFDM symbols.

In FIG. 4, blocks expressed by the same pattern correspond to a resource region corresponding to a wide beam configured by a plurality of narrow beams in FIG. 3. In particular, in FIG. 4, four 01-DM symbols (e.g., OFDM symbols #0 to #3) correspond to a time duration for which an RF beam is transmitted in a manner that four antenna subarrays form a wide beam in FIG. 3. Subsequently, next four OFDM symbols correspond to a resource region corresponding to a different wide beam. This is because a region corresponding to a single wide beam is unable to cover the entire cell.

In particular, FIG. 4 illustrates a case that a PSS/SSS/PBCH is repeatedly transmitted over 4 OFDM symbols in a single wide beam region. In particular, a resource region corresponding to a single wide beam region where a synchronization signal is repeatedly transmitted by a plurality of RF chains is referred to as a 'basic synchronization signal block'. In FIG. 4, a BRS corresponds to a beam reference signal used in a synchronization procedure.

2. Proposed Method of Configuring Synchronization Signal

In the following, a method of configuring a synchronization signal is proposed in a communication system using the aforementioned ultrahigh frequency band.

Figure 5:
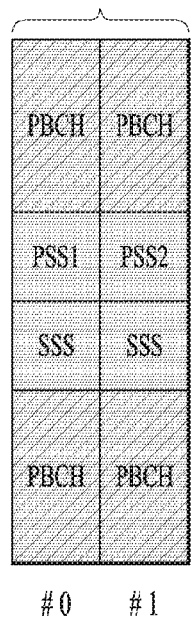
FIG. 5 illustrates a procedure of defining a physical layer identity (ID) according to a proposed embodiment.

FIG. 5 illustrates a procedure of defining a physical layer identity (ID) according to a proposed embodiment According to one embodiment, a PSS transmitted for synchronization can be defined by a different sequence combination or can be defined by applying an OCC (Orthogonal Cover Code) to the same sequence combination or a different sequence combination. And, a physical layer ID is defined by a combination of a sequence and an OCC.

A PSS group corresponds to PSSs included in a basic synchronization signal block. FIG. 4 illustrates a case that a basic synchronization signal block includes four 01-DM symbols and four PSSs are repeatedly transmitted. On the other hand, in the following proposed embodiment, for clarity, an example of configuring a basic synchronization signal block by two OFDM symbols is explained. In particular, a synchronization signal is repeatedly transmitted two times in a single narrow beam region. FIG. 5 illustrates an example that a basic synchronization signal block is configured by two 01-DM symbols.

The proposed embodiment is different from the synchronization subframe structure mentioned earlier in FIG. 4 in that PSSs transmitted in a basic synchronization signal block are different from each other. In particular, referring to FIG. 4, the same PSS is repeatedly transmitted in a basic synchronization signal block. On the contrary, according to the proposed embodiment, since PSSs (i.e., PSS group), which are transmitted over a plurality of OFDM symbols in a basic synchronization signal block, are configured by a different sequence combination, a sequence itself is different or an OCC is applied in the course of repetition. Hence, it may be able to define a different phase. In particular, a combination of a sequence applied to a PSS group and an OCC can be defined as a physical layer ID.

Table 2 in the following shows an example of implementing PSSs constructing a PSS group and a physical layer ID. Referring to Table 2, three physical layer IDs (i.e., 0, 1, and 2) are defined. It means that a single wide beam region covers a region of a cell as much as 120'.

TABLE 2

| Repetition | Sequence | physical layer identity |
|---|---|---|
| 2 | $[S_{25}, S_{29}]$ | 0 |
| | $[S_{25}, -S_{29}]$ | 1 |
| | $[S_{34}, S_{38}]$ | 2 |

In Table 2, a sequence combination configured by two sequences corresponds to a PSS 1 and a PSS 2 shown in FIG. 5. In particular, $\{S_{25}, S_{29}\}$ indicates that a sequence $S_{25}$ is transmitted by the PSS 1 of FIG. 5 and a sequence $S_{29}$ is transmitted by the PSS 2. A sequence itself of a PSS can be differently inputted for repetitive transmission of two times (25, 29 or 34, 38) and it may apply a different phase by applying an OCC ($S_{25}$, $S_{29}$ or $S_{25}$, $-S_{29}$). Each physical layer ID corresponds to a combination of a different sequence and an OCC. Table 2 illustrates an example that three physical layer IDs are defined for a repetition of two times.

Table 3 in the following illustrates examples that the number of OFDM symbols (i.e., PSS transmission count) constructing a basic synchronization signal block corresponds to 3 and 4. In Table 3, similar to Table 2, a PSS sequence and an OCC vary during a time duration for which a synchronization signal is repeatedly transmitted. A physical layer ID is defined by a combination of a PSS sequence and an OCC.

TABLE 3

| repetition | Sequence | OCC | physical layer identity |
|---|---|---|---|
| 3 | $[S_{25}, S_{29}, S_{34}]$ | 1 1 1 | 0 |
| | | $1\ e^{j2\pi/3}\ e^{j4\pi/3}$ | 1 |
| | | $e^{j4\pi/3}\ 1\ e^{j2\pi/3}$ | 2 |
| 4 | $[S_{25}, S_{29}, S_{34}, S_{38}]$ | 1 1 1 1 | 0 |
| | | 1 1 −1 −1 | 1 |
| | | 1 −1 −1 1 | 2 |

Figure 6:
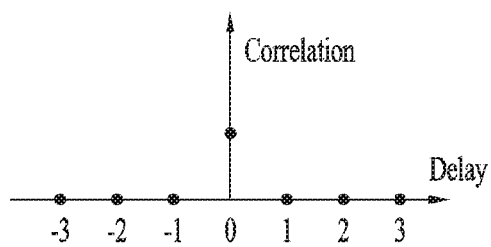
FIG. 6 is a diagram for explaining synchronization performance enhancement according to a proposed embodiment.

FIG. 6 is a diagram for explaining synchronization performance enhancement according to a proposed embodiment.

If a physical layer ID is defined by a legacy LTE/LTE-A PSS only, as shown in FIG. 4, the same PSS is repeatedly transmitted. In this case, when a receiver calculates a peak value in the course of performing timing synchronization, a second value compared to the maximum value becomes bigger. The occurrence of a side lobe brings about an ambiguity problem in a timing synchronization calculation result.

On the other hand, if a PSS sequence and an OCC vary according to a proposed embodiment, as shown in FIG. 6, the occurrence of a side lobe is minimized in a timing synchronization calculation result. In particular, since it is able to suppress the occurrence of a potential ambiguity problem, it is able to improve timing synchronization estimation performance and physical layer ID estimation performance.

Figure 7:
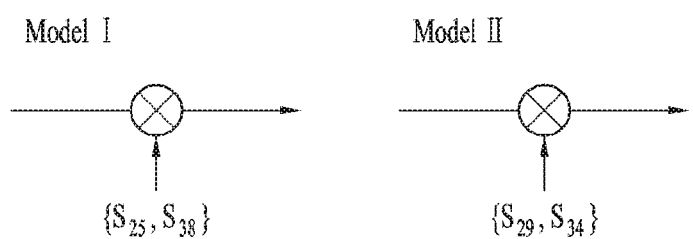
FIGS. 7 and 8 are diagrams illustrating a different embodiment proposed by the present invention.
Figure 8:
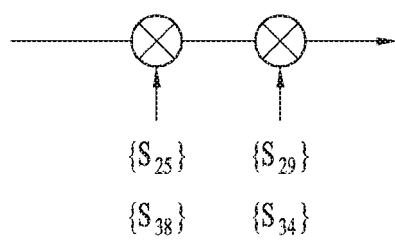

FIGS. 7 and 8 are diagrams illustrating a different embodiment proposed by the present invention.

According to the aforementioned proposed embodiment, a physical layer ID is defined by a combination of a PSS sequence and an OCC. In addition, when a physical layer ID is defined, it may be able to combine sequences in a relationship of a ZC conjugate pair for a single physical layer ID.

Table 4 in the following illustrates an example that a synchronization signal is repeatedly transmitted two times in a basic synchronization signal block.

TABLE 4

| Sequence Group | Physical Layer Identity (PLI) |
|---|---|
| $\{S_{25}, S_{38}\}$ | 0 |
| $\{S_{25}, -S_{38}\}$ | 1 |
| $\{S_{29}, S_{34}\}$ | 2 |

When sequences in a relationship of a ZC conjugate pair are combined to define a physical layer ID, FIG. 7 illustrates a PSS estimation procedure of a receiver (i.e., UE). In particular, it is able to define a physical layer ID by applying an OCC to a combination of sequences in a relation of a conjugate pair (e.g., $\{S_{25}, \pm S_{38}\}$ or $\{S_{29}, S_{34}\}$). In FIG. 7, a receiver is configured to have a correlator and the correlator can operate in a mode 1 or a mode 2.

When physical layer IDs are defined as Table 4, a receiver of a UE operates in a mode 1 first and performs an estimation procedure on physical layer IDs 0 and 1. When the receiver operates in the mode 1, if a maximum correlation value of a PSS is obtained, the UE determines a physical layer ID by 0 or 1 (as a maximum correlation value). On the contrary, if a maximum correlation value is not sensed in the mode 1, the UE operates in the mode 2 and performs an estimation procedure on a physical layer ID 2.

Meanwhile, in the abovementioned procedure, it may have a merit resulted from defining a physical layer ID by a combination of sequences in a relationship of a ZC conjugate pair. In particular, when sequences are in a relationship of a ZC conjugate pair, if one correlation value is calculated, another correlation value is automatically obtained. For example, in case of calculating a correlation value of a sequence of $S_{25}$, a correlation value of $S_{38}$ is obtained. In case of calculating a correlation value of a sequence of $S_{29}$, a correlation value of $S_{34}$ is obtained (and vice versa).

In particular, a UE operating as FIG. 7 can perform a PSS estimation procedure with low complexity. However, according to the abovementioned method, since it is able to examine the entire sequences only when a UE changes an operation mode of a correlator, relatively long time is required for searching for the entire cells. However, since sampling time is very fast in a broadband system such as mmWave compared to a legacy communication scheme, a correlator of high performance is required. Hence, the abovementioned method has a merit in that it is able to minimize implementation cost and power consumption.

According to a different embodiment, sequences in a relationship of a ZC conjugate pair can be arranged in the same order in a PSS combination. Table 5 illustrates a procedure of defining a physical layer ID according to the embodiment.

TABLE 5

| Sequence Group | Physical Layer Identity (PLI) |
| --- | --- |
| $\{S_{25}, S_{38}\}$ | 0 |
| $\{S_{25}, -S_{38}\}$ | 1 |
| $\{S_{29}, S_{34}\}$ | 2 |

In an implementation example according to Table 5, sequences in a relationship of a ZC conjugate pair can be arranged in the same order in a PSS combination. For example, $S_{25}$ and $S_{38}$ in a relationship of a conjugate pair can be located at the first of a PSS combination which is repeated two times. $S_{29}$ and $S_{34}$ in a relationship of a conjugate pair can be located at the second of the PSS combination.

In other word, a single physical layer ID according to the present invention can be generated by applying an OCC to a combination of a first PSS sequence (e.g., $S_{25}, S_{38}$) located at the first and a second PSS sequence (e.g., $\pm S_{29}, S_{34}$) located at the second. In this case, the first PSS sequence and the second PSS sequence are not in a conjugate relationship. Yet, the first PSS sequence corresponds to one of a plurality of PSS sequences (e.g., $S_{25}, S_{38}$) in a conjugate relationship and the second PSS sequence also corresponds to one of a plurality of PSS sequences (e.g., $\pm S_{29}, S_{34}$) in a conjugate relationship. In particular, as shown in Table 5, a physical layer ID 0 corresponds to a value resulted from applying an OCC to $\{S_{25}, S_{29}\}$, a physical layer ID 1 corresponds to a value resulted from applying an OCC to $\{S_{25}, -S_{29}\}$, and a physical layer ID 2 corresponds to a value resulted from applying an OCC to $\{S_{38}, S_{34}\}$.

FIG. 8 illustrates an operation of a UE estimating a PSS in the abovementioned embodiment. In the embodiment of FIG. 8, a UE is configured to include two correlators. The first correlator measures a correlation between a sequence $S_{25}$ and a sequence $S_{38}$ only and the second correlator measures a correlation between a sequence $S_{29}$ and a sequence $S_{34}$ only. In the abovementioned implementation example, the two correlators of the UE can simultaneously examine a reception signal of a length of two consecutive OFDM symbols.

According to the aforementioned embodiment, since the UE operates two correlators, it is not necessary for the UE to store a previously calculated result value. Hence, it may be able to have a merit in that it is not necessary to have a buffer (or memory). Table 6 in the following illustrates an example that the example of Table 5 is extensively applied to a repetition number repeated 4 times.

TABLE 6

| Sequence Group | Physical Layer Identity (PLI) |
| --- | --- |
| $\{S_{25}, S_{29}, S_{38}, S_{34}\}$ | 0 |
| $\{S_{25}, -S_{29}, S_{38}, -S_{34}\}$ | 1 |
| $\{S_{25}, -S_{29}, -S_{38}, S_{34}\}$ | 2 |

If a receiver is implemented as Table 6, unlike a repetition count repeated two times, it is necessary for the receiver to have a buffer. In this case, since the buffer stores a result value of $S_{38}$ and $S_{34}$ only, a relatively small buffer size is required only.

According to a different embodiment, a nested property can be satisfied according to a size of a PSS group. The nested property corresponds to a structure that elements of a set having a small size are included in a set having a big size as it is. An embodiment proposed by the present invention proposes a method that a PSS group of a small size is included in a PSS group of a big size. In Tables 7 and 8 in the following, it is able to see that a PSS group of a repetition count repeated two times shown in Table 8 is identically included in a PSS group of a repetition count repeated four times shown in Table 7.

TABLE 7

| Sequence Group | Physical Layer Identity (PLI) |
| --- | --- |
| $\{S_{25}, S_{29}, S_{34}, S_{38}\}$ | 0 |
| $\{S_{25}, -S_{29}, S_{34}, -S_{38}\}$ | 1 |
| $\{-S_{38}, -S_{34}, S_{29}, S_{25}\}$ | 2 |

TABLE 8

| Sequence Group | Physical Layer Identity (PLI) |
| --- | --- |
| $\{S_{25}, S_{29}\}$ | 0 |
| $\{S_{25}, -S_{29}\}$ | 1 |
| $\{-S_{38}, -S_{34}\}$ | 2 |

When a transmitter defines a PSS group of a different size according to a subcarrier, as shown in Tables 7 and 8, it may be able to define a PSS group to have a nested property. According to the method above, as shown in Table 7, although a single matching table having a big size is stored, since it is able to automatically induce Table 8, it is able to define a plurality of PSS groups having a different size at a time.

In the foregoing description, an embodiment of defining a physical layer ID by a combination of a PSS sequence and an OCC has been explained. Subsequently, in FIG. 9, an embodiment for an SSS is explained.

If a physical layer ID is defined according to the aforementioned embodiment, a receiver can perform timing synchronization based on received synchronization signals. In particular, the receiver can identify precise timing of a synchronization signal received in a basic synchronization signal block. Meanwhile, the receiver may fail to identify a basic synchronization block to which a synchronization signal received by the receiver belongs within a synchronization subframe. In particular, an ambiguity problem may occur. A procedure for solving the problem can be referred to as a procedure of detecting a symbol location or a subframe boundary.

In the following, an embodiment of applying an OCC to an SSS to make a receiver identify a basic synchronization signal block is proposed. A different OCC is applied to each basic synchronization signal block. As shown in FIG. 5, an SSS can be repeatedly transmitted in a manner of being FDMed with a PSS. A different OCC is applied to each of basic synchronization signal blocks.

Figures 9, 10:
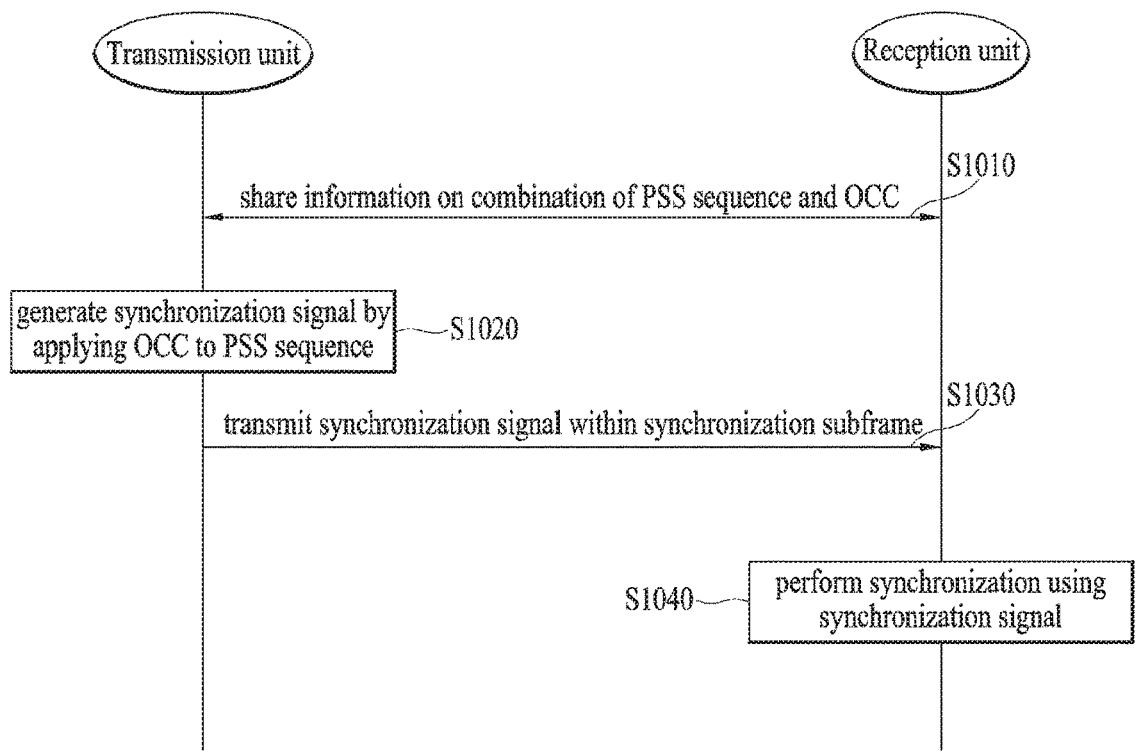
FIG. 9 is a diagram illustrating a proposed embodiment for an SSS.
FIG. 10 is a flowchart for a method of transmitting a synchronization signal according to a proposed embodiment.

Referring to FIG. 9, if a repetition count of a synchronization signal corresponds to 4, it may be able to apply an OCC 0 {1 1 1 1} to four SSSs included in a basic synchronization signal block located at the fore part. On the contrary, it may be able to apply an OCC 1 {1−1 1−1} to four SSSs included in a basic synchronization signal block located at the rear part. In particular, if an OCC is applied to SSSs, it is able to solve the ambiguity problem between basic synchronization signal blocks without additional resource allocation.

FIG. 10 is a flowchart for a method of transmitting a synchronization signal according to a proposed embodiment. FIG. 10 illustrates a series of procedures that a transmission unit (i.e., base station) configures a synchronization signal and transmits the synchronization signal to a reception unit (i.e., UE) according to the aforementioned embodiments.

First of all, a combination of a PSS sequence and an OCC is shared between a transmission unit and a reception unit to identify a physical layer ID [S1010]. In particular, it is able to perform a synchronization procedure only when information on a combination of a PSS sequence and an OCC defining a physical layer ID is shared between the transmission unit and the reception unit in advance in response to a repetitive transmission count of a synchronization signal (or the number of OFDM symbols constructing a basic synchronization signal block). In particular, the information on the combination of the PSS sequence and the OCC defining the physical layer ID can be shared in a manner that the information is forwarded to the reception unit from the transmission unit or the information is configured in advance between the two entities.

Subsequently, the transmission unit generates a synchronization signal by applying an OCC to a PSS sequence within a synchronization subframe [S1020]. The synchronization signal is transmitted to the reception unit via a plurality of OFDM symbols within a basic synchronization signal block of the synchronization subframe [S1030] and the reception unit performs synchronization using the received synchronization signal [S1040]. In particular, the reception unit checks synchronization timing using a sequence combination of the PSS and the OCC applied to the PSS of the synchronization signal. Meanwhile, if the PSS and an SSS are transmitted in a manner of being FDMed in the synchronization subframe, the reception unit checks the SSS to identify a basic synchronization signal block corresponding to the received synchronization signal in the synchronization subframe. This procedure can be comprehended as a beam scanning procedure.

In the foregoing embodiment, a beam scanning-based synchronization subframe structure and a synchronization signal configuration method have been proposed. According to the aforementioned embodiments, a method of detecting a physical layer ID and a symbol location (or subframe boundary) can be newly defined.

3. Device Configuration

Figure 11:
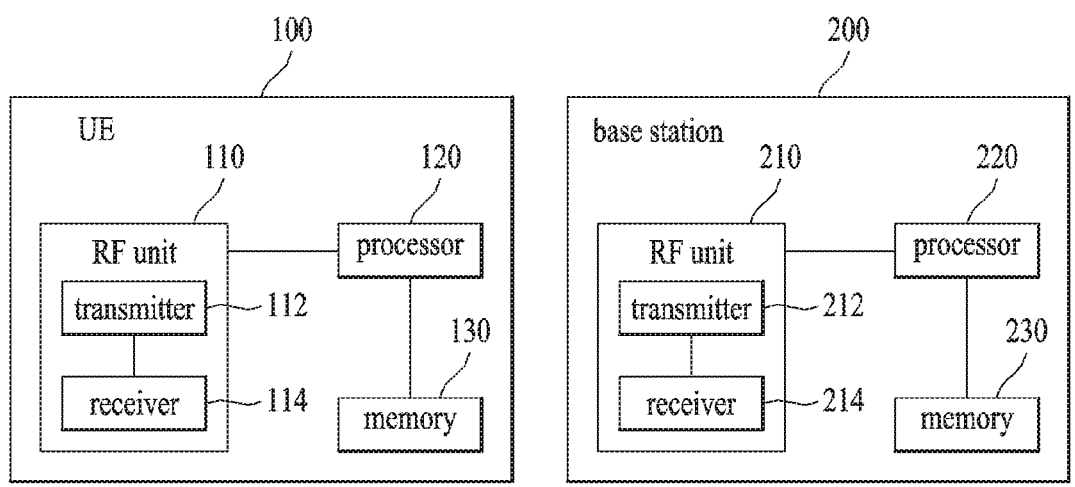
FIG. 11 is a diagram illustrating configurations of a user equipment and a base station related to a proposed embodiment.

FIG. 11 is a block diagram showing the configuration of a user equipment and a base station according to one embodiment of the present invention. In FIG. 11, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 11, a communication environment may be established between a plurality of user equipment and the base station. In addition, the base station 200 shown in FIG. 11 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned synchronization signal transmission method can be applied not only to 3GPP LTE and LTE-A system but also to various wireless communication systems including an IEEE 802.16x system and IEEE 802.11x system. Further, the proposed method can also be applied to an mmWave communication system using ultrahigh frequency band.

What is claimed is:

1. A method of transmitting a synchronization signal, which is transmitted by a base station in a communication system using an mmWave band, the method comprising:
generating a Primary Synchronization Signal (PSS) group by applying an Orthogonal Cover Code (OCC) to a combination of PSS sequences different from each other to be transmitted over a plurality of time durations;
arranging an SSS to a region adjacent to a resource region allocated to the PSS group on a frequency axis;
generating a synchronization signal consisting of the PSS group and the SSS; and
transmitting the synchronization signal over a plurality of the time durations,
wherein the PSS group corresponds to a physical layer ID, and
wherein the PSS group is transmitted in a single basic synchronization signal block contained in a synchronization subframe and wherein the single basic synchronization signal block corresponds to a wide beam area configured by a plurality of antenna subarrays.

2. The method of claim 1, wherein the PSS group is generated by applying an OCC to a combination of PSS sequences in a conjugate relationship.

3. The method of claim 1, wherein the PSS group is generated by applying an OCC to a combination of a first PSS sequence and a second PSS sequence, wherein the first PSS sequence and the second PSS sequence are not in a conjugate relationship, and wherein each of the first PSS sequence and the second PSS sequence corresponds to one of a plurality of PSS sequences in a conjugate relationship.

4. The method of claim 1, wherein PSS groups having a different size are configured to satisfy a nested property.

5. The method of claim 1, wherein a different OCC is applied to the SSS and wherein a different OCC is applied to SSSs transmitted in a different basic synchronization signal block.

6. A base station transmitting a synchronization signal in a communication system using an mmWave band, the base station comprising:
a transmitter;
a receiver; and
a processor configured to operate in a manner of being connected with the transmitter and the receiver,
wherein the processor configured to:
generate a Primary Synchronization Signal (PSS) group by applying an Orthogonal Cover Code (OCC) to a combination of PSS sequences different from each other to be transmitted over a plurality of time durations,
arrange an SSS to a region adjacent to a resource region allocated to the PSS group on a frequency axis,
generate a synchronization signal consisting of the PSS group and the SSS, and
transmit the synchronization signal over a plurality of the time durations,
wherein the PSS group corresponds to a physical layer ID, and
wherein the PSS group is transmitted in a single basic synchronization signal block contained in a synchronization subframe and wherein the single basic synchronization signal block corresponds to a wide beam area configured by a plurality of antenna subarrays.

7. The base station of claim 6, wherein the PSS group is generated by applying an OCC to a combination of PSS sequences in a conjugate relationship.

8. The base station of claim 6, wherein the PSS group is generated by applying an OCC to a combination of a first PSS sequence and a second PSS sequence, wherein the first PSS sequence and the second PSS sequence are not in a conjugate relationship, and wherein each of the first PSS sequence and the second PSS sequence corresponds to one of a plurality of PSS sequences in a conjugate relationship.

9. The base station of claim 6, wherein PSS groups having a different size are configured to satisfy a nested property.

10. The base station of claim 6, wherein a different OCC is applied to the SSS and wherein a different OCC is applied to SSSs transmitted in a different basic synchronization signal block.

* * * * *